United States Patent
Biehl et al.

(10) Patent No.: US 10,508,963 B2
(45) Date of Patent: Dec. 17, 2019

(54) METHOD AND DEVICE FOR KNOCK RECOGNITION OF AN INTERNAL COMBUSTION ENGINE

(71) Applicant: Robert Bosch GmbH, Stuttgart (DE)

(72) Inventors: Matthias Biehl, Krottelbach (DE); Carsten Kluth, Stuttgart (DE); Jasmin Dieringer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 191 days.

(21) Appl. No.: 15/708,763

(22) Filed: Sep. 19, 2017

(65) Prior Publication Data
US 2018/0087994 A1    Mar. 29, 2018

(30) Foreign Application Priority Data
Sep. 28, 2016 (DE) .......................... 10 2016 218 673

(51) Int. Cl.
*G01L 23/22*    (2006.01)

(52) U.S. Cl.
CPC .................. *G01L 23/227* (2013.01)

(58) Field of Classification Search
CPC .................................................. G01L 23/227
USPC ....................................................... 73/35.04
See application file for complete search history.

(56) References Cited

U.S. PATENT DOCUMENTS

| | | | |
|---|---|---|---|
| 2002/0073766 A1* | 6/2002 | Sauler | F02P 5/152 73/35.04 |
| 2012/0271536 A1* | 10/2012 | Hamedovic | F02D 35/02 701/111 |
| 2013/0096809 A1* | 4/2013 | Haeming | F02D 13/0219 701/111 |
| 2015/0114088 A1* | 4/2015 | Fischer | G01L 23/221 73/35.01 |
| 2015/0120167 A1* | 4/2015 | Perless | F02D 41/22 701/102 |
| 2015/0281838 A1* | 10/2015 | Hershey | G06K 9/00973 381/71.4 |
| 2016/0305841 A1* | 10/2016 | Angeby | F02D 35/027 |

FOREIGN PATENT DOCUMENTS

DE    10 2013 221 993 A1    4/2015

* cited by examiner

*Primary Examiner* — Natalie Huls
*Assistant Examiner* — Monica S Young
(74) *Attorney, Agent, or Firm* — Norton Rose Fulbright US LLP; Gerard Messina

(57) ABSTRACT

A method and a device are provided for knock recognition of an internal combustion engine, which device Fourier-transforms, weights in frequency-dependent fashion, and sums a signal of a knock sensor in order to produce a first knock signal. Here, from a multiplicity of first knock signals, a concentration point of the multiplicity of the first knock signals is determined, and a first offset value is subtracted from the first knock signal in order to form a second knock signal, the first offset value being ascertained from the concentration point of the multiplicity of the first knock signals, and a second knock signal that has a value below zero being set to the value zero. The further-processed second knock signal is then evaluated as knocking or non-knocking.

13 Claims, 4 Drawing Sheets

METHOD AND DEVICE FOR KNOCK RECOGNITION OF AN INTERNAL COMBUSTION ENGINE

CROSS REFERENCE

The present application claims the benefit under 35 U.S.C. § 119 of German Patent Application No. DE 102016218673.6 filed on Sep. 28, 2017, which is expressly incorporated herein by reference in its entirety.

BACKGROUND INFORMATION

German Patent Application No. DE 10 2013 221 993 A1 describes a method for recognizing a knocking of an internal combustion engine in which the signal of a knock sensor is Fourier-transformed, weighted in frequency-dependent fashion, and is then summed in order to produce a knock signal. On the basis of this knock signal there then takes place a recognition as to whether a knocking combustion is present or not.

SUMMARY

An example method according to the present invention, and an example device according to the present invention may have the advantage that an improved distinction is made between knocking and non-knocking combustion. Essential for the knock recognition is the treatment of the signal background, because the knocking signal is always evaluated relative to a background noise.

According to the present invention, a position of a concentration point is ascertained of the knocking signals of a multiplicity of combustions, and this is used to ascertain the background. For this purpose, an offset signal is subtracted that results from the concentration point of a multiplicity of knock signals, and during this process values that would be below zero are set to zero. This has the result that even knock signals having very low background noise levels supply a certain contribution to the background noise, thus achieving an improvement of the recognition as to whether a signal is knocking or not.

Further advantages and improvements are described herein. Through multiplication by a factor, the knock signals of different cylinders at different rotational speeds and states of load are made comparable. In this way, a uniform threshold is created for distinguishing knocking and non-knocking combustions. In order to distinguish whether a knock signal is to be evaluated as knocking or non-knocking, a comparison with a floating mean value of the knock signal can take place. Alternatively, it is also possible to compare the knock signal to a fixed comparison value, which can if needed be determined individually for each cylinder as a function of load and rotational speed. The first offset value can be divided into a pre-control value and an adaptation value, the pre-control value being ascertained during an application of the internal combustion engine, and the adaptation value being ascertained during running operation of the internal combustion engine. The second offset value can also be ascertained as pre-control value and adaptation value. Through the use of a pre-control value, an adequate basic data input for the method according to the present invention is already ensured, with which a good knock recognition is already possible. In order to also take into account variations between different internal combustion engines, or aging of the internal combustion engine, in the knock recognition, a further adaptation of this value can then be provided that acquires, during running operation, an adaptation to the different internal combustion engines or an aging of the internal combustion engine. All parameters for the processing of the knock signals can here be a function of the rotational speed of the load and the respective cylinder, i.e. can be adapted to the individual cylinder. In this way, an optimal adaptation is achieved to different operating states of the internal combustion engine or the different cylinders of the internal combustion engine. Through an additional multiplication of the knock signal by an additional factor, an adaptation of the distribution of the knock signals can again be achieved, further improving the distinction between knocking and non-knocking combustions.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
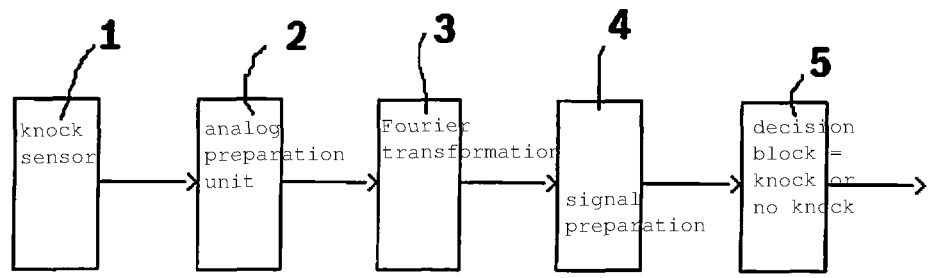
FIG. 1 shows a general overview of the method for knock recognition.

FIG. 1 schematically shows the method according to the present invention for knock recognition. A knock sensor 1 produces a measurement signal which is then given to an analog signal preparation unit 2 for further processing. Such a knock sensor 1 is a standard vibration or noise sensor that is connected to the internal combustion engine. Through the combustion arising in the combustion chamber of the internal combustion engine, sound waves are produced in the internal combustion engine that are picked up by knock sensor 1 as corresponding signals. When knocking combustions occur in the internal combustion engine, these knocking combustions differ from the knock signals of a non-knocking combustion. Through evaluation of the signals, it can therefore be determined whether a knocking or a non-knocking combustion has occurred in the internal combustion engine. The signals of knock sensor 1 are first prepared in analog fashion. For this purpose, the signals are amplified, filtered, and subjected to analog/digital conversion. As output, a prepared digital signal is thus given to Fourier transformation 3 by analog preparation unit 2.

In processing block 3 there takes place a Fourier transformation of the signal and, subsequently, a weighting of the Fourier-transformed signal. Through this weighting it is achieved that frequencies in which particularly strong disturbances occur are not taken into account, while frequencies that are significant for a knocking are taken into account more strongly. In this way, a signal is produced that is particularly well-suited for making a statement as to whether a knocking combustion has taken place or not. The Fourier-transformed and weighted signal is then summed in order to obtain a knock signal.

This first knock signal is made up only of an amplitude value of a signal strength that is a measure of the noises or vibrations produced by the respective combustion. On the basis of this signal alone, it can then be decided whether a knocking combustion is present or not. Here it is problematic that in order to decide whether the combustion was knocking or not, this signal has to be compared to a comparison value. However, because the noise level or vibration level of an internal combustion engine varies greatly during operation, the knock signal, or the signal with which the knock signal is compared in order to decide whether a knocking combustion is present or not, must take into account the changing background noise. The first knock signal produced by processing block 3 is therefore subjected, in the further processing step 4, to a signal preparation in which the changes in the background level are taken into account. The knock signal prepared in this way is then given to a decision block 5 in which a final decision takes place as to whether the combustion was knocking or not.

Figure 2:
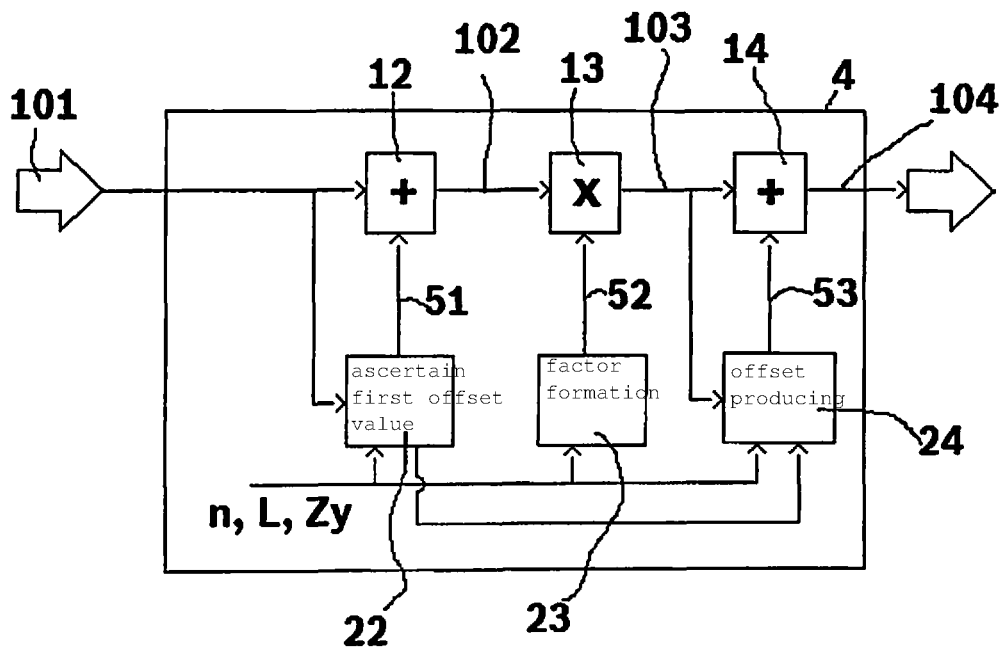
FIG. 2 shows the details of method step 4 from FIG. 1.

In FIG. 2, the details of signal preparation 4 are shown. As input signal, signal preparation block 4 receives first knock signal 101, which is formed from the signal of the knock sensor, prepared in analog fashion and subsequently Fourier-transformed, weighted, and summed. This first knock signal 101 is supplied to an addition block 12. In addition block 12, a value is added to first knock signal 101 that is provided by a processing step 22. In method step 22, a first offset value 51 is ascertained that is given to addition block 12. The offset value here has a negative sign, so that this is a de facto subtraction.

Figure 4:
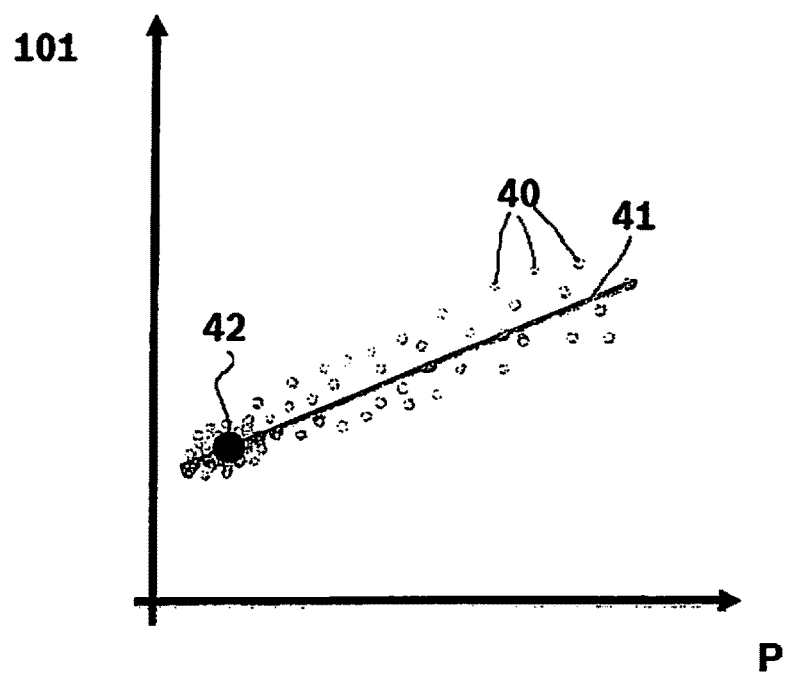
FIGS. 4 through 8 show the changes of the data due to the individual processing steps.

The ascertaining of this first offset value is now explained on the basis of FIG. 4. In FIG. 4, the peak pressure p actually occurring in a combustion chamber of the internal combustion engine and the first knock signal 101, i.e. the output signal of processing block 3, are plotted to the right in a diagram for a multiplicity of measurements during operation of the internal combustion engine. As can be seen, there forms a cloud of measurement points 40 that are situated at a distance from a best-fit line 41. When all the measurement points are taken into account, there results a concentration point at a relatively low peak pressure p and a relatively low first knock signal 101. Even if a series of measurement points are situated far above concentration point 42, the predominant number of measurement results are still situated in the vicinity of concentration point 42. This cloud of measurement values 40 contains predominantly non-knocking combustions and only very few knocking combustions, so that concentration point 42 is situated at a correspondingly low peak pressure p and a correspondingly low first knock signal 101. The intensity of first knock signal 101 at the concentration point gives information about the strength of the background noise, i.e. the noise that occurs even during non-knocking combustions. Offset value 51 is now dimensioned such that by subtracting offset value 51 from first knock signal 101, concentration point 42 is set to a value of zero for first knock signal 101. Through these measures, the background noise of concentration point 42 is thus reduced to zero. Because a portion of the real measurement values also have values for first knock signal 101 that are lower than the intensity of first knock signal 101 at concentration point 42, during real operation negative values for the knock signal processed in this way would then also arise. Because a negative knock signal does not make sense, these values are simply set to zero.

Through this subtraction step, from block 12 a second knock signal 102 is thus formed that is then further processed.

Offset signal 51 is formed from a pre-control value and an adaptation value. The pre-control value is here a function of rotational speed n, load L, and the relevant cylinder Zy, and was ascertained during an application of the internal combustion engine. This pre-control value is permanently stored in a memory, and is used for the formation of first offset value 51, as a function of the rotational speed/load and the cylinder. In addition, in offset formation block 22 all input first knock signals 101 are continuously processed in order to determine the concentration point of all occurring first knock signals 101 during running operation of the internal combustion engine. This simply takes place in that from all combustion processes, the first knock signals 101 are used for mean value formation of the concentration point of first knock signals 101. Here as well it can again be provided that this formation takes place as a function of the rotational speed, the load, and individually for each cylinder. The pre-control value and the adaptation value of first offset value 51 are then added in order to form offset value 51.

Second knock signal 102 produced by addition block 12 is supplied to a multiplication block 13 in which all values of second knock signal 102 are multiplied by a factor 53 that is provided by a factor formation block 23. Through this multiplication, the intensity distribution of second knock signal 102 is compressed or expanded. Because second factor 52 is again selected as a function of rotational speed/load and the relevant cylinder, through this measure it can be achieved that the values for second knock signal 102 are comparable between different cylinders. In addition, in this way it can also be achieved that the values are comparable at different rotational speeds or for different loads. Through the modification in block 13, in this way a third knock signal 103 is formed that represents the input of a further addition block 14.

In addition block 14, a further offset signal 53 is added that was formed by offset producing block 24. Offset forming block 24 produces a second offset signal 53 in such a way that the concentration point of a multiplicity of third knock signals 103 is shifted to a certain intensity. This is the addition of an artificial noise background. A part of this noise background was again ascertained during an application as pre-control value, as a function of rotational speed/load and the relevant cylinder.

A further part is again formed as adaptation value, two different ways of adaptation being possible. On the one hand, an adaptation value can be used that was derived from the ascertaining of the concentration point of first knock signal 101. This signal is provided to offset producing block 24 by offset producing block 22. Alternatively, however, offset producing block 24 can use a concentration point that results from third knock signal 103. The concentration point of third knock signal 103 would then indicate whether the concentration point is actually at intensity level zero, or is slightly above zero. Through the addition of second offset value 53, in this way an artificial background noise is added to third knock signal 103, in order in this way to produce a fourth knock signal 104. Because in subtraction step 12 all intensities of the knock signal below zero are set to the fixed value zero, the addition of second offset value 53 corresponds to the addition of an artificial background noise. It is thus assumed that too-soft combustions are only a random fluctuation of the measurement value, and that it therefore makes more sense to replace such too-soft combustions with a fixed value, namely the artificial background noise.

Fourth knock signal 104 formed in this way is then finally used, in method step 5, for an evaluation as to whether a knocking combustion or not is present. For this purpose, the intensity of the fourth knock signal is simply compared to a comparison value. This comparison value can be ascertained during the application of the internal combustion engine and can be held in a corresponding memory as a function of rotational speed/load and the respective cylinder. Through the numerous adaptation steps, the distribution of the ascertained fourth knock signals 104 can be adapted in such a way that a good decision can be made as to whether the combustion was knocking or non-knocking. Alternatively, a multiplicity of fourth knock signals 104 can be continuously used for a floating mean value formation. A recognition of a knocking combustion takes place when a currently ascertained fourth knocking signal 104 clearly exceeds the floating mean value, the threshold from which a combustion is evaluated as knocking also again being determined in cylinder-individual fashion as a function of rotational speed and load.

Figure 3:
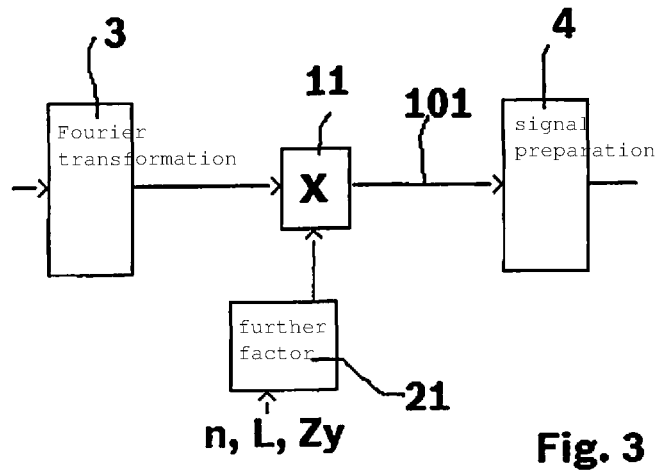
FIG. 3 shows an alternative method having an additional processing step.

FIG. 3 describes another alternative method in which, in addition to the processing steps of signal preparation 4, a further multiplication, and thus further influencing of the signal, takes place. The output signal of transformation block 3, i.e. the Fourier-transformed frequency-weighted and summed signal, is multiplied, in a further multiplication block 11, by a factor that is provided by a factor ascertaining block 21. The output signal of this further multiplication block 11 then represents first knock signal 101, supplied to signal preparation unit 4 for further processing. The further factor is provided by block 21, again as a function of the rotational speed, the load, and the relevant cylinder. The ascertaining of the corresponding factors again takes place during an application of the internal combustion engine. Through this further multiplication, a further compression or expansion of the knock signal can thus be achieved before the further processing in signal preparation block 4. There is thus a further degree of freedom in the adaptation of the signal preparation for the production of fourth knock signal 104.

In the following FIGS. 4 through 8, the individual processing steps of the signal are shown graphically. The method according to the present invention is shown in these Figures in connection with the application, i.e. the adaptation of the method to the respective type of internal combustion engine. During an application, in addition to the actual signal of the knock sensor, a further signal is available, namely a cylinder pressure signal p, and there in particular the peak pressure occurring during the combustion, for the analysis of the knock signals.

In FIG. 4, first knock signal 101 is plotted against peak pressure p for a multiplicity of combustions. As can be seen immediately from FIG. 4, the knock signals measured in this way form, against the pressure, an approximately linear cloud of measurement points 40 situated in a particular scatter region around a best-fit line 41. It is also essential that a multiplicity of measurement points are situated in a region having a low first knock signal 101 and pressure p; i.e., these are predominantly non-knocking combustions in which both first knock signal 101 and occurring peak pressure p are low. When concentration point 42 of all plotted measurement points 40 is regarded, it is thus also clear that concentration point 42 is situated in a region having a low value of first knock signal 101 and a low peak pressure p.

In the application phase, i.e., in the phase in which basic values are defined for the knock recognition of a particular type of internal combustion engine, in addition to first knock signal 101 peak pressure p is also provided. During running operation of the internal combustion engine, no ascertaining of peak pressure p is then further provided, so that only first knock signal 101 is then available. The purpose of the application is to already achieve a good adaptation of the knock recognition to the internal combustion engine, so that during running operation only production fluctuations between different internal combustion engines of the same type, or changes over time (aging), have to be adapted, i.e., trained.

In the following, in FIGS. 5-8 the measurement values are indicated only by best-fit line 41 and concentration point 42. The best-fit line 41 and concentration point 42 obtained through the respective processing step are shown as solid best-fit line 41 and filled concentration point 42, while the preceding concentration point 42 is shown as an open circle, and the preceding best-fit line 41 is shown as a dashed line.

Figure 5:
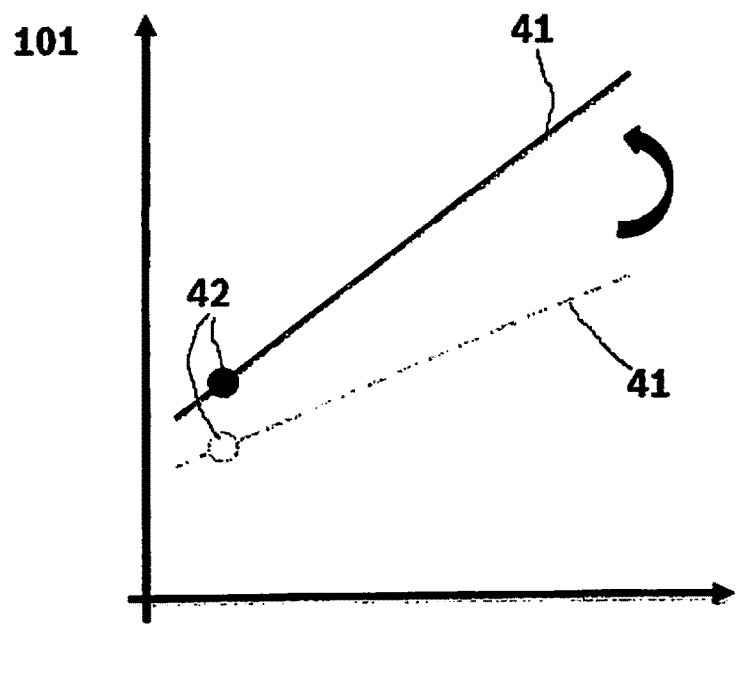

FIG. 5 shows the effect of optional multiplication 11 as described in relation to FIG. 3. Through multiplication 11, the slope of best-fit lines 41 and the position of concentration point 42 are adapted; in the example of FIG. 5 the slope is increased and the concentration point is shifted upward. However, this step is optional and offers only a further possibility for adapting the measurement values. In this way, in particular differences between individual cylinders can be compensated.

Figure 6:
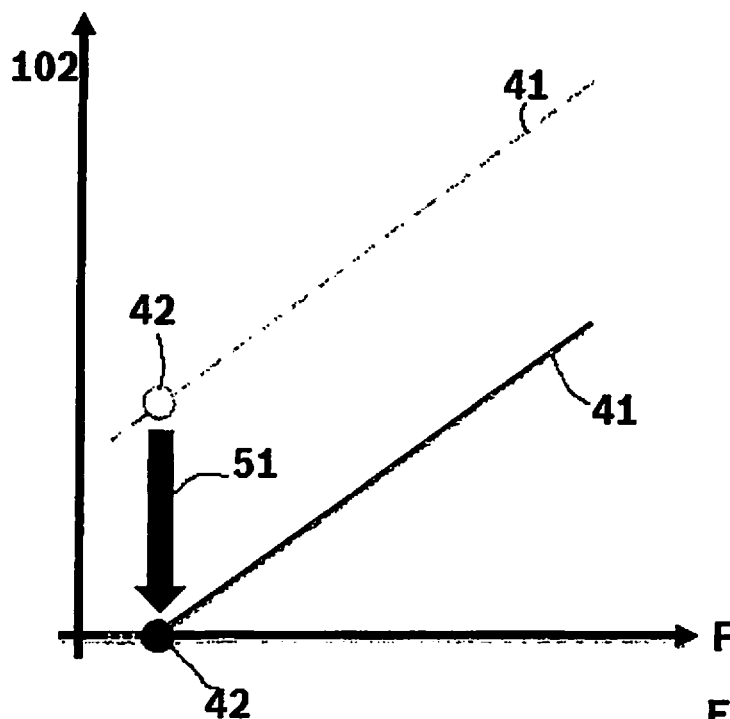

In FIG. 6, the effect of addition 12 is then shown. Starting from signal 101, . . . either FIG. 4 or FIG. 5 there takes place a subtraction of first offset value 51, shown by the arrow in FIG. 6. As can be seen, in this way concentration point 42 is shifted to the zero point, and all values that are below zero after this shift are set to the value zero. Here, this first offset value 51 has a pre-control portion and an adapted portion. The pre-control portion was produced during the application, i.e., during the data evaluation as shown in FIG. 6. However, the position of concentration point 42 of first knock signal 101 is continuously monitored by processing block 22, and if during running operation there results a shift in this concentration point, a corresponding adaptation value is produced for the determination of first offset 51. Both values are then used in the running operation of the internal combustion engine for the production of first offset value 51.

Figure 7:
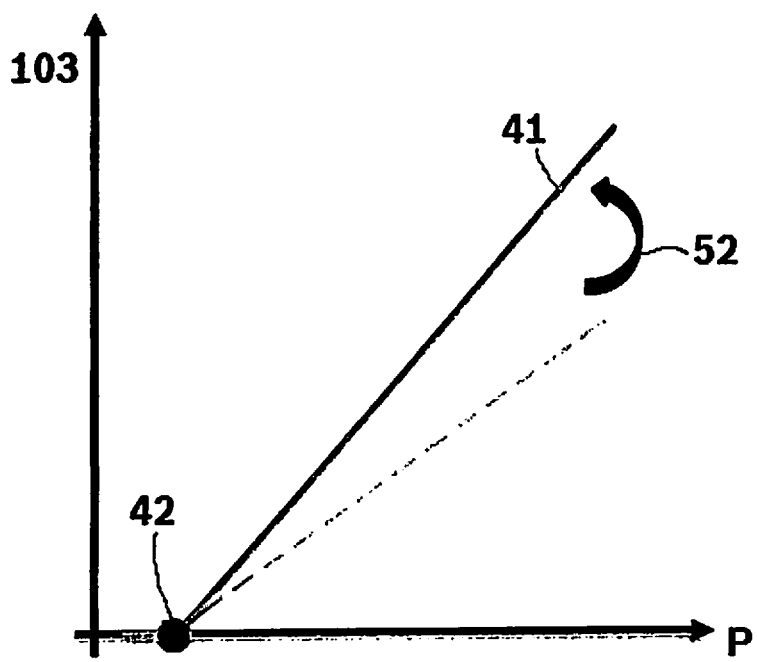

FIG. 7 shows the effect of further multiplication step 13. As can be seen, through this multiplication step only the slope of best-fit line 41 is influenced, while concentration point 42 remains, uninfluenced, at the value zero.

Figure 8:
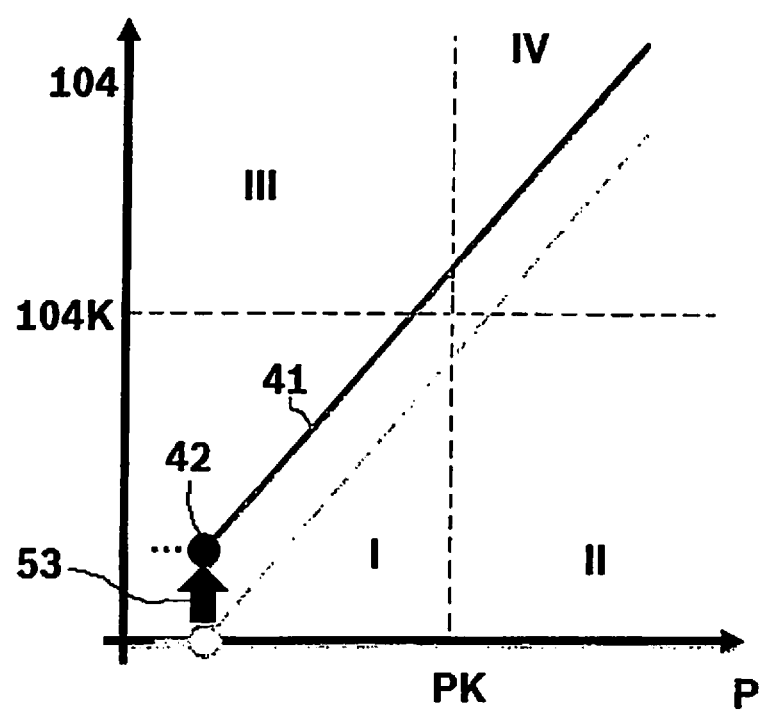

FIG. 8 then shows the influence of the data through addition step 14, in which a second offset 53 is added. Through this measure, concentration point 42 is set to a base value specified by second offset 53. Likewise, best-fit line 41 is shifted in parallel to higher values for knock signal 104. Second offset value 53 again has a pre-control value and an adaptation value. The pre-control value is again ascertained during the application of the internal combustion engine. The adaptation value for second offset value 53 is ascertained during running operation of the internal combustion engine, either through evaluation of first knock signal 101 or through evaluation of third knock signal 103. Here the goal is to set concentration point 42 of fourth knock signal 104 to a base value that makes sense.

In addition, in FIG. 8 a threshold value PK and a value for fourth knock signal 104K are plotted, and are entered in the diagram through correspondingly dashed lines. Peak pressures p higher than the value PK are to be evaluated as knocking combustions. Because this peak pressure p is not measured during running operation, a corresponding value for fourth knock signal 104K is selected, a combustion being evaluated as knocking when fourth knock signal 104 exceeds threshold value 104K. The characteristic map shown in FIG. 8 is thus divided into four quadrants I, II, III, and IV.

If a knock signal 104 occurs in region I, this is not a non-knocking combustion, and is therefore unproblematic. When a fourth knock signal is in region IV, this is a knocking combustion, and an intervention is required to reduce the knocking. If a knock signal 104 occurs that is in region II, this is a knocking operation that however was not recognized. This region therefore must be avoided in all cases, because it can cause damage to the internal combustion engine. If a fourth knock signal is in region III, the combustion is rated as knocking, and measures are taken to reduce the knocking that standardly impair the performance of the internal combustion engine.

Threshold value 104K, from which a combustion is evaluated as knocking, is always selected such that in real operation no measurement values can lie in quadrant II. Combustions in this quadrant II must be avoided in all cases, because this can cause damage to the internal combustion engine. However, it has turned out that given such a choice of threshold 104K, with a conventional knock recognition combustion processes continue to occur in third quadrant III, thus impairing the performance of the internal combustion engine overall. Through the method according to the present invention for processing the signals of the knock sensor, the scatter of the measurement values was reduced at both sides of best-fit line 41, thus improving the knock recognition. In particular, the number of events in region III was significantly reduced compared to a conventional knock regulation. This is due in particular to the fact that through the subtraction of the background noise and addition of an artificial background noise, the influence of the clearly non-knocking combustions was significantly reduced. Due to this measure, the scatter of the knock signals around best-fit line 41 was significantly reduced, and in this way a significant improvement was achieved in particular in the region of the weakly knocking combustions (region III). Therefore, significantly fewer combustion processes are evaluated as knocking, although the occurring peak pressures still do not cause damage to the internal combustion engine. In this way, the efficiency of the internal combustion engine can be improved.

What is claimed is:

1. A method for knock recognition of an internal combustion engine, the method comprising:
   receiving a signal of a knock sensor, the signal of the knock sensor being Fourier-transformed, weighted in frequency-dependent fashion, and summed, in order to produce a first knock signal;
   determining, based on a multiplicity of first knock signals considered together, a concentration point of the multiplicity of the first knock signals;
   subtracting a first offset value from the first knock signal to form a second knock signal, the first offset value being ascertained from the concentration point of the multiplicity of the first knock signals, wherein when the second knock signal has a value that is below zero, the second knock signal is set to a value of zero; and
   evaluating the second knock signal as knocking or non-knocking;
   wherein each one of the multiplicity of the first knock signals is produced based on a different signal of the knock sensor, the different signal being Fourier-transformed, weighted in frequency dependent fashion, and summed to produce the one of the multiplicity of the first knock signals, and
   wherein the concentration point is determined using a best-fit line through measurement points.

2. The method as recited in claim 1, wherein the first offset value has a pre-control value and an adaptation value, the pre-control value being ascertained during an application of the internal combustion engine, and the adaptation value being ascertained during running operation of the internal combustion engine.

3. The method as recited in claim 1, wherein for the formation of the second knock signal from the first knock signal, before the subtraction of the first offset value there additionally takes place a multiplication of the first knock signal by a further factor, the further factor being a function of a rotational speed of the internal combustion engine, a load of the internal combustion engine, and a respective cylinder of the internal combustion engine.

4. The method as recited in claim 1, wherein the measurement points represent peak pressures occurring in the engine versus the multiplicity of the first knock signals.

5. A method for knock recognition of an internal combustion engine, the method comprising:
   receiving a signal of a knock sensor, the signal of the knock sensor being Fourier-transformed, weighted in frequency-dependent fashion, and summed, in order to produce a first knock signal;
   determining, from a multiplicity of first knock signals, a concentration point of the multiplicity of the first knock signals;
   subtracting a first offset value subtracted from the first knock signal to form a second knock signal, the first offset value being ascertained from the concentration point of the multiplicity of the first knock signals, wherein when the second knock signal has a value that is below zero, the second knock signal is set to a value of zero; and
   evaluating the second knock signal as knocking or non-knocking;
   wherein the second knock signal is multiplied by a factor to form a third knock signal, and a second offset value is added to the third knock signal to form a fourth knock signal, wherein one of: (i) the second offset value being ascertained from the concentration point of the multiplicity of first knock signals, or (ii) a concentration point of the multiplicity of the third knock signals is determined from a multiplicity of third knock signals, and the second offset value is ascertained from the concentration point of the multiplicity of the third knock signals, and wherein the fourth knock signal is evaluated as knocking or non-knocking, wherein the factor is a value that is selected as a function of load and rotational speed of the engine.

6. The method as recited in claim 5, wherein the fourth knock signal is compared to a floating mean value of fourth knock signals to evaluate the fourth knock signal as knocking or non-knocking.

7. The method as recited in claim 5, wherein the fourth knock signal is compared to a comparison value in order to evaluate the fourth knock signal as knocking or non-knocking.

8. The method as recited in claim 5, wherein the second offset value has a pre-control value and an adaptation value, the pre-control value being ascertained during an application of the internal combustion engine, and the adaptation value being ascertained during running operation of the internal combustion engine.

9. The method as recited in claim 5, wherein at least one of the first offset value and the second offset value is a function of the rotational speed of the internal combustion engine, a load of the internal combustion engine, and a respective cylinder of the internal combustion engine.

10. A processor configured for knock recognition of an internal combustion engine, the processor configured to:
    Fourier transform, weight in frequency-dependent fashion, and sum a signal of a knock sensor to produce a first knock signal; and determine, based on a multiplicity of first knock signals considered together, a concentration point of the multiplicity of the first knock signals, and subtract a first offset value from the first knock signal to form a second knock signal, the first offset value being ascertained from the concentration point of the multiplicity of the first knock signals, wherein when the second knock signal has a value below zero, the second knock signal is set to a value of zero, and the device is configured to evaluate the second knock signal as knocking or non-knocking;

wherein each one of the multiplicity of the first knock signals is produced based on a different signal of the knock sensor, the different signal being Fourier-transformed, weighted in frequency dependent fashion, and summed to produce the one of the multiplicity of the first knock signals, and wherein the concentration point is determined using a best-fit line through measurement points.

11. The processor as recited in claim 10, wherein the measurement points represent peak pressures occurring in the engine versus the multiplicity of the first knock signals.

12. A knock detection device for monitoring an internal combustion engine, the device comprising:

a knock sensor configured to send a measurement signal of engine noise to a series of processing units configured to:

Fourier transform, weight in frequency-dependent fashion, and sum the measurement signal to produce a first knock signal; and determine, based on a multiplicity of first knock signals considered together, a concentration point of the multiplicity of the first knock signals, and subtracts a first offset value from the first knock signal to form a second knock signal, the first offset value being ascertained from the concentration point of the multiplicity of the first knock signals, wherein when the second knock signal has a value below zero, the second knock signal is set to a value of zero, and the device is configured to evaluate the second knock signal as knocking or non-knocking;

wherein each one of the multiplicity of the first knock signals is produced based on a different signal of the knock sensor, the different signal being Fourier-transformed, weighted in frequency dependent fashion, and summed to produce the one of the multiplicity of the first knock signals, and wherein the concentration point is determined using a best-fit line through measurement points.

13. The knock detection device as recited in claim 12, wherein the measurement points represent peak pressures occurring in the engine versus the multiplicity of the first knock signals.

* * * * *